US005421490A

United States Patent [19]

Lichte

[11] Patent Number: 5,421,490

[45] Date of Patent: Jun. 6, 1995

[54] PASTY MEDIA DISPENSER WITH CONVEYOR MEANS ON COVER

[75] Inventor: Joachim Lichte, Rietberg, Germany

[73] Assignee: Böllhoff Verfahrenstechnik GmbH & Co., Bielefeld, Germany

[21] Appl. No.: 152,219

[22] Filed: Nov. 12, 1993

[30] Foreign Application Priority Data

Nov. 13, 1992 [DE] Germany ........................ 9215464 U

[51] Int. Cl.[6] ........................................ G01F 11/28

[52] U.S. Cl. .................................... 222/257; 417/205; 417/430; 222/235; 222/405; 366/186

[58] Field of Search ............... 222/405, 257, 235, 379; 417/199.1, 430, 900, 205; 366/186, 194, 195, 196

[56] References Cited

U.S. PATENT DOCUMENTS

| | | | |
|---|---|---|---|
| 650,569 | 5/1900 | Shaw | 222/405 |
| 1,704,784 | 3/1929 | Brubaker | 222/405 |
| 2,385,579 | 9/1945 | King et al. | 222/235 |
| 2,895,648 | 7/1959 | Woughter | 222/235 |

FOREIGN PATENT DOCUMENTS

| | | | |
|---|---|---|---|
| 2533901 | 4/1984 | France | 222/405 |
| 2029671 | 12/1971 | Germany | 222/405 |
| 4086383 | 3/1992 | Japan | 417/900 |
| 2069060 | 8/1981 | United Kingdom | 417/900 |

*Primary Examiner*—Richard A. Bertsch
*Assistant Examiner*—Roland G. McAndrews, Jr.
*Attorney, Agent, or Firm*—Darby & Darby

[57] ABSTRACT

Disclosed is a pump device for pastry or paste-like media. The medium is located in a container and within the container a cover is lowered under the influence of a pressure device. The cover has on its underside, inclined surfaces which are inclined in the direction of a suction opening. The pump device allows a dependable conveyance of the medium, even in an unfavorable relationship of the suction pressure and the viscosity of the medium, by using a conveyor device within the container which helps move the medium.

7 Claims, 1 Drawing Sheet

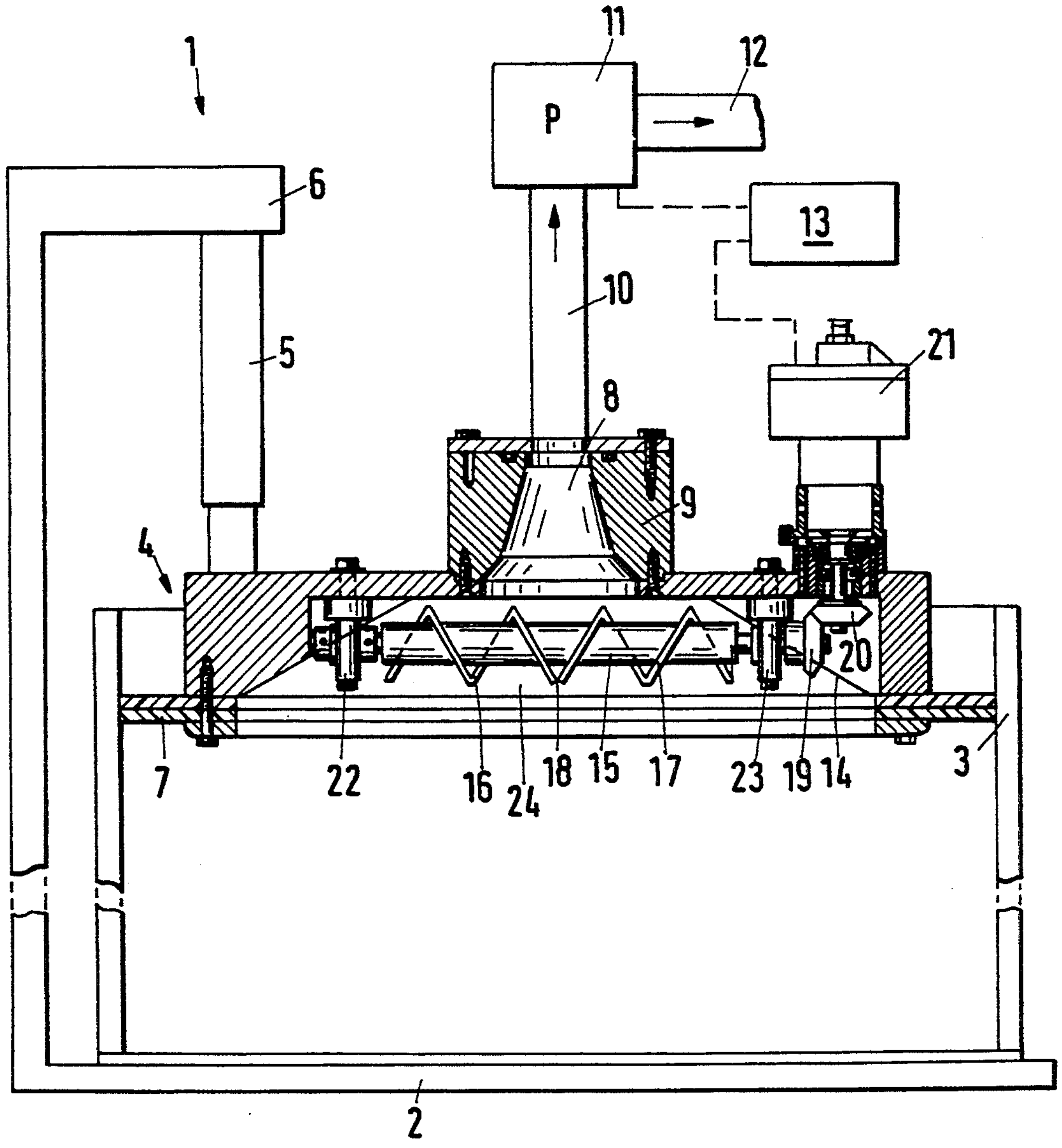
1
11
P
12
6
13
10
5
21
8
9
4
20
7
22
16
24
18
15
17
23
19
14
3
2

PASTY MEDIA DISPENSER WITH CONVEYOR MEANS ON COVER

FIELD OF THE INVENTION

The present invention relates generally to a pump device for pastry or paste-like media. More specifically, the present invention relates to a container having a medium within the container and a cover being moveable into the container under the influence of a pressure device and having inclined surfaces on its underside which are inclined in the direction of a suction opening.

BACKGROUND OF THE INVENTION

Pumps are currently being used in the handling and conveying of high viscosity masses which are, for example, being delivered from barrels. In use, the locking cover of a barrel is removed. In its place, a cover is placed on the content within the barrel, that is, in contact with the pastry medium of high viscosity that is to be conveyed. The cover is then pushed into the interior of the barrel. Upon a downward movement of the cover, that is, a movement of the cover into the interior of the barrel, the medium located within the barrel is displaced in the direction of a suction opening. From this opening, the medium is removed with the help of a pump whose suction-side end is in connection with the suction opening.

Notwithstanding the foregoing pump arrangements, there are still major problems involved. Under certain operating conditions, especially, when the negative pressure is too high in relation to the viscosity of the medium, a hollow space in the shape of a bell or dome is formed below the suction opening resulting in the pump operating in a dry-run mode.

Increasing the pressure on the cover in order to displace the medium faster toward the direction of the suction opening and in greater amounts, is only possible to a limited extent. The applicable pressure is limited, for example, by the structural stability of the container and the cover. On the other hand, it is sometimes not possible to increase the suction pressure or the desired suction volume because, at the exit of the pump, a certain volume flow or a certain pressure is needed. The formation of a hollow dome or bell below the cover from which no more medium can be suctioned, is therefore, not only damaging for the pump, but also has a deleterious effect on the thereafter following work process for which a mostly continuous flow of medium is essential.

An object of the present invention is to provide a pump device which provides a reliable conveyance of medium even under unfavorable conditions of suction pressure and viscosity of the medium.

SUMMARY OF THE INVENTION

In accordance with a preferred embodiment demonstrating further objects, features and advantages of the invention, a pump device includes a conveyance device within the container, which device moves the medium. Because of this additional intervention within the container, the cover within the container can be lowered deeper into the container without an appreciable increase in the required pressure. Once the medium is in movement or in flow, it can be displaced easier in the direction of the suction opening, thus, avoiding a hollow dome-or-bell-shaped space from being created below the suction opening from which no more medium can be suctioned. Better yet, because of the pressing in of the cover into the container, the area that has a vulnerability of being hollow, is continuously being replenished with the medium.

The conveyance device, in a preferred embodiment, conveys the medium to a location which is situated essentially below the suction opening. The conveyance device is not limited to a mere movement of the medium because, more importantly, the movement is guided in a predetermined direction. The medium flows or is pushed in the direction of the suction opening. Because the medium is being removed from this area, which is located in the vicinity of the inclined surfaces, it is easier to push the cover inwardly into the container. The energy being expended to drive the conveyance device is, thus, partially recovered from the reduced pressure required for pushing the cover down into the container.

Preferably, the conveyance device is movable in unison with the cover and will maintain a certain and constant distance therefrom. Accordingly, one is assured that the medium is always moved by the conveyance device in a location that most favorably supports the suction.

Herein, it is especially advantageous that the conveyance device be fastened to the cover. In this manner, a constantdistance can be maintained with relatively simple means. Also, the unitary movement of the conveyance device with the cover can be realized in a simple manner. Preferably, the conveyance device is located on the underside of the cover in the area of the inclined surfaces. In other words, the conveyance device is arranged within two planes which form the upper and the lower margins of the inclined surfaces, whereas the terms "upper" and "lower", etc. are related to the positioning of the cover within the container and are utilized herein to simplify the present description and are not intended to limit the orientation of the pump assembly when mounted for use. The side facing the interior of the container is the lower side, while the side or surface of the cover facing outwardly from the container is the upper side. This relationship is independent from the positioning of the container in space. Because the conveyance device is located in the area of the inclined surfaces, the medium located there can be conveyed in the direction of the suction opening.

Advantageously, the conveyance device is arranged substantially horizontally and is preferably of a driven and double acting screw type, having two augers with a reversal point of its augers being located essentially below the suction opening. The double acting screw conveyor conveys medium from its axial outer ends toward the inside, where the suction opening is located so that the conveyed medium can be suctioned off immediately.

In a pump device having a pump connected to the suction opening, it is preferred that the conveyance device has a motor that is connected to the control device of the pump and is activated simultaneously with the pump. The conveyance device then works only when in fact medium is being taken away by the pump. Accordingly, any superfluous operation is avoided. In this manner, an energy favorable operation is realized.

BRIEF DESCRIPTION OF THE DRAWING

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein the one drawing Figure shows a pump device according to the present invention.

DETAILED DESCRIPTION OF THE PRESENTLY PREFERRED EXEMPLARY EMBODIMENTS

The pump device 1 has a frame 2 in which a container 3 is provided. The container can be of a known type, such as a "200-barrel". The transport or locking cover has been removed from the container 3. Instead, a cover 4 has inserted into the container 3 and is pushed into the container 3 with the help of a schematically shown hydraulic or pneumatic piston-cylinder unit 5. The piston-cylinder unit 5 is connected to the frame 2 by an arm 6. For the sake of simplicity and clarity, merely one piston-cylinder unit 5 is illustrated. However, several piston-cylinder units 5 are preferably arranged circumferentially to avoid a canting of the cover 4 within the container 3.

The cover 4 has at its circumferential edge sealing lips 7 which abut the inner side of the container 3 in a sealing manner. The cover 4 has a suction opening 8 provided with a suction flange 9 placed on the cover 4. A pump 11 has a suction line 10 connected to the suction flange 9 and, thereby, will suction off the medium located in the container 3 and delivers the same to a further processing station (not shown). The pump 11 is controlled by a control device 13 which switches the pump 11 on or off, according to the demand.

The cover 4 is shown having a certain thickness. It is, however, not massive because it is hollow in its interior, resulting in an area which is open in the direction of the container 3. The cover 4, therefore, has the shape of an inverted U with the opening of the U communicating with the interior of the container 3. The U has inner flanks 14 which, however, are not oriented parallel to the axis of the container 3, but are instead inclined in the direction of the suction opening 8.

In operation, when the cover 4, under the influence of the piston-cylinder unit 5 is pushed into the container 3, the medium located in the container 3 will be displaced. However, the medium can only escape in the direction of the suction opening 8, because the sealing lips 7 abut against the inner wall of container 3. Because the surfaces 14 of the cover 4 are inclined, the displacement of the medium toward the suction opening 8 is enhanced. However, when the viscosity of the medium located in the container 3 is relatively high, such as with a very flow-sluggish or even paste-like material, and the suction pressure of the pump 11 is added, a hollow area in the shape of a dome or a bell may form below the suction opening 8 resulting in this area being devoid of any medium. The effective pressure from the piston-cylinder-unit 5 can only be increased to a certain extent because, when they reach a certain magnitude, there is the danger that the walls of the container 3 cannot withstand the load. Also, when operating with a higher pressure, there is no assurance that the suction-emptied area will be refilled quickly enough because the flow speed of the medium is normally limited.

In order to overcome this detriment, a double acting screw conveyor 15 is placed substantially horizontally within the container 3 and preferably normal to the axis of the container 3. The screw conveyor includes two augers 16, 17 of which one is rotating clockwise while the other is rotating counter-clockwise. Both augers 16, 17, thereby, act against each other. Their reversing point is preferably located essentially under the suction opening 8. The conveyor screw itself is driven by a motor 21 by way of gears 19, 20. The motor 21 is preferably controlled by the same control device which activates the pump 11. This control device 13 can be constructed in such a way that it activates the motor 21 only when the pump 11 is also activated.

The screw conveyor 15 is fastened at both of its ends in bearing supports 22, 23 on the cover 4. It is also arranged in the interior of the cover, that is, in hollow area 24. When the cover 4 is pushed into the container 3 by way of the piston-cylinder unit 5, the hollow area 24 is filled with the medium. The pump 11 and the motor 21 are activated simultaneously. The pump 11 suctions the medium from the hollow area 24. At the same time, the screw conveyor 15 conveys the medium from the inner flanks 14 of the cover 4 in the direction of the suction opening 8 so that the medium is continually resupplied into the hollow area 24 below the suction opening 8. Because the medium is being removed from the rim areas of the cover 4, the cover 4 can be pushed downward more easily while under the pressure influence of the piston-cylinder unit 5. Thus, the medium can be resupplied into the hollow area 24 quickly where it is conveyed by the screw conveyor 15 in the direction of the suction opening 8.

By supporting the screw conveyor 15 in the cover 4, the screw conveyor 15 is moved simultaneously with and is maintained in constant optimum distance relative to the cover 4. That is, the screw conveyor 15 dips deep enough into the medium to convey the same in the direction of the suction opening 8, but is not immersed too deep into the medium to impair its effectiveness in the areas where it is most needed.

Driving the screw conveyor 15 with motor 21 requires a certain amount of energy. However, this energy is partially recovered because the piston-cylinder unit 5 meets reduced pressure and less energy is, thus, expended here.

Having described the presently preferred exemplary embodiment of a new and improved pump arrangement in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What I claim is:

1. A pump device for pastry media comprising: a container having means for receiving a medium therein; a cover being moveable into said container, said cover having a suction opening and inclined surfaces on its underside, said surfaces being inclined in the direction of the suction opening; and conveyer means being disposed within said container for moving the medium from said container to said suction opening; said conveyor means includes a double acting and driven screw conveyor being arranged substantially horizontally within said cover, said screw conveyor having two augers and having their reversal point located adjacent to said suction opening.

2. A pump device according to claim 1, further comprising a pump connected to said suction opening, said conveyor means having a motor connected thereto, said motor being connected to a control device, said pump being connected to said control device such that both said pump and said motor are activated simultaneously by said control device.

3. A pump device according to claim 1, wherein said conveyor means moves said medium to a position located adjacent to said suction opening.

4. A pump device according to claim 3, further comprising a pump connected to said suction opening, said conveyor means having a motor connected thereto, said motor being connected to a control device, said pump being connected to said control device such that both said pump and said motor are activated simultaneously by said control device.

5. A pump device according to claim 1, wherein said conveyor means is movable in unison with said cover and at a constant distance therefrom.

6. A pump device according to claim 5, wherein said conveyor means is fastened to said cover.

7. A pump device according to claim 6, wherein said conveyor means is disposed adjacent to said inclined surfaces.

* * * * *